United States Patent [19]

Tanaka et al.

[11] Patent Number: 5,554,397
[45] Date of Patent: Sep. 10, 1996

[54] METHODS FOR PRODUCING CHEESE TYPE FOOD AND AGED TYPE CHEESE FROM POWDERED MILK AS A STARTING MATERIAL

[75] Inventors: Hozumi Tanaka; Ryoichi Sueyasu, both of Yamanashi, Japan

[73] Assignee: Snow Brand Milk Products Co., Ltd., Hokkaido, Japan

[21] Appl. No.: 263,241

[22] Filed: Jun. 21, 1994

Related U.S. Application Data

[63] Continuation of Ser. No. 912,037, Jul. 9, 1992, abandoned, which is a continuation of Ser. No. 602,739, Oct. 24, 1990, abandoned.

[30] Foreign Application Priority Data

Oct. 25, 1989 [JP] Japan .................................. 1-278056
Apr. 20, 1990 [JP] Japan .................................. 2-104974

[51] Int. Cl.[6] .................................................. A23C 9/12
[52] U.S. Cl. .................................. 426/36; 426/34; 426/38; 426/39; 426/40; 426/43; 426/580; 426/582; 426/471

[58] Field of Search ............................ 426/40, 43, 580, 426/582, 588, 471, 34, 36, 38, 39, 42, 583, 587

[56] References Cited

FOREIGN PATENT DOCUMENTS 8201806  6/1982  WIPO ...................................... 426/40

OTHER PUBLICATIONS

Campbell, J. R. and Marshall, R. T., 1975, "The Science of Providing Milk for Man", McGraw–Hill, New York, p. 716.

*Primary Examiner*—Leslie Wong
*Attorney, Agent, or Firm*—Burgess, Ryan and Wayne

[57] ABSTRACT

A method of producing cheese-type food from powdered milk as a starting material, prepared by ultrafiltrating milk, adjusting the ultrafiltrated milk to pH 5.0–5.8 and by spray-drying it, which is then heated and melted with an addition of emulsifying salts. Also a method or producing aged-type cheese by ripening green cheese processed from powdered milk, prepared by adding lactic-acid bacteria starter to ultrafiltrated milk and dried.

9 Claims, No Drawings

METHODS FOR PRODUCING CHEESE TYPE FOOD AND AGED TYPE CHEESE FROM POWDERED MILK AS A STARTING MATERIAL

This application is a continuation of application Ser. No. 912,037 filed Jul. 9, 1992, now abandoned, which is a continuation of U.S. Pat. No. 602,739 filed Oct. 24, 1990, now abandoned.

BACKGROUND OF THE INVENTION

1. Field of the Invention

This invention relates to methods of producing cheese-type food and aged-type cheese.

2. Description of the Prior Art

Conventionally, processed cheese and cheese-type food are typically produced by preparing natural cheese as a starting material, adding appropriate emulsifying salts, heating and then cooling.

However, since natural cheese must be left to ripening with the passage of time, the number of days for ripening cheese are limited when processed cheese and cheese-type food are produced.

Therefore, enough cheese and cheese-type food are not necessarily produced to meet needs or demand.

Natural cheese, oil the other hand, is produced by adding rennet to the liquid milk, cutting and stirring to separate out whey and to obtain curd, which is then fermented under suitable conditions.

This method requires huge investment in equipment as well as a skilled artisan.

Furthermore, milk as a starting material cannot be stored very long, and must be made into natural cheese as soon as possible after purchase. This factor also makes it difficult to produce desired products in accordance with the needs and demand.

To solve these problems, methods of producing cheese-type products from powder such as casein have been proposed (e.g. Japanese Patent Laid Open Publication No. 56-68349, and Japanese Patent Publication Nos. 56-10013 and 57-2294).

These are, however, methods of producing cheese-like food and no methods of producing natural cheeses by ripening have been reported. Besides, in most of those reports, acid casein or calcium caseinate is used to obtain cheese-like food which have the smell of casein that is too strong for flavorful cheese.

SUMMARY OF THE INVENTION

The present invention has been completed to solve these problems.

The first object of the present invention is to provide methods of producing cheese-type food and aged-type cheese by specially-prepared powdered milk.

The second object of the present invention is to provide methods of producing cheese-type food and aged-type cheese easily with simple equipment, without being affected by the degree of natural cheeses aging.

The third object is to provide methods of producing cheese-type food and aged-type cheese having sufficient flavor without the pronounced smell of casein.

Other objects of the present invention will become clear in the Detailed Description and Preferred Embodiment and Examples that follow.

These objects of the present invention are achieved by using powdered milk as a starting material which is prepared by concentrating milk, adjusted to pH 5.0–5.8 and drying.

Furthermore the objects of the present invention are also achieved by using powdered milk as a starting material, which is prepared by adding a lactic-acid bacteria starter to the foregoing concentrated milk and drying.

DETAILED DESCRIPTION AND PREFERRED EMBODIMENT

One feature of the present invention is to produce cheese-type food (including processed cheese) from powdered milk as a main starting material, obtained by concentrating milks such as, for example, fresh milk and processed milk, the main component of which is fresh milk, adjusting the concentrated milk to pH 5.0–5.8, and then spray drying it, adding emulsifying salts and water to the powdered milk and heating the resulting mixture, adding more water to aid melting, and then cooling it.

Another feature of the present invention is to produce aged-type cheese (natural cheese) from powdered milk as a main starting material, obtained by adding lactic-acid bacteria starter to milks such as, for example, fresh milk or processed milk, the main component of which Is fresh milk, concentrating and spray drying the milk thus adjusted to pH 5.0–5.8, and adding water and sodium chloride to the powdered milk, putting into a mold and pressing to obtain green cheese, and ripening for required period.

In the present invention, it is preferable to concentrate milk by ultrafiltration 2–6 fold concentrations, after it has been pasteurized and cooled in the usual manner. It is desirable that concentration is performed by ultrafiltration because this method concentrates milk without also condensing lactose, rendering superior powdered milk. Ultrafiltering 2–6 fold concentrations makes drying process efficient even at fairly low temperature of hot blown air (100° C.) and exhaust air (60° C.). Ultrafiltrated milk thus obtained is cooled to 15° C. or below, to which an organic acid, such as lactic acid or citric acid, is added, or alternatively, lactic acid bacteria starter added before cooling to biologically acidify it to pH 5.0–5.8, followed by cooling. Cooling to 15° C. or below prevents acid-induced coagulation even the pH is adjusted about 5.0. It does coagulate if its acidity is made stronger than pH 5.0. If made less acid than pit 5.8, good powdered milk is not obtained because of low drying temperature.

Next, this pH-adjusted, ultrafiltrated milk is dried, or dried after converting its κ-casein into para κ-casein by adding rennet and setting undisturbed for half an hour or so to obtain powdered milk. Converting κ-casein in milk to para κ-casein by adding rennet is not essential. Drying should be done under the temperature of hot blowing air at 80° to 100° C., and that of exhausted air at 60° to 80° C., until the water content in milk falls to 5% or below.

To produce cheese-type food in the present invention, by using powdered milk as a starting material obtained as above, water is added to the powdered milk in the intended proportion to the water content of the final product, mixed well, and emulsifying salts, such as sodium polyphosphate, sodium monophosphate or sodium citrate, are added to produce cheese-type food in the usual manner. Specifically, emulsifying salts and seasoning are added to the powdered milk described above, and the resulting mixture is placed in a emulsifying unit used for making processed cheese. Then water is added to make the water content of the final product about 45%, and the mixture is heated and melted under stirring. Heating is stopped when the temperature of the fusing mixture reaches 65° C., and cheese flavor or other flavoring is added, followed by quick pasteurizing under heat. The fusing mixture is then cooled to obtain cheese-type food.

To produce aged-type cheese (natural cheese) by using powdered milk as a starting material, prepared as above, in the manner of the present invention, water is added to the powdered milk in intended proportion of the finished product's water content, mixed well, and the whole lot is poured into a mold, pressed and ripened in the usual manner to obtain natural cheese.

The cheese-type food (including processed cheese) thus obtained is in no way inferior to cheese products produced by conventional methods, both in flavor and texture. Aged-type cheese (natural cheese) of the present invention also compare quite favorably to conventionally-made natural cheeses in flavor and texture.

Moreover, since cheese-type food is prepared from powdered milk as a starting material, the present invention has an advantage that it has no need for natural cheese which requires considerable operation and labor, compared with the conventional process by using natural cheese as a starting material, and the starting material stores well to allow flexible production to meet seasonal changes in necessary output and market demand.

Natural cheese prepared according to the present invention reaches ripening index of about 26% {(soluble nitrogen content/total nitrogen content)×100}, with rich flavor and pleasant, slightly sour aftertaste. Since it is made from powdered milk, the starting material stores well, and cheese can be produced in areas without dairy industry, and production can be adjusted flexibly to meet the changes in cheese output and market demand.

Furthermore, the method of the present invention has an advantage that no by-products such as whey yield when curd is formed.

The following Examples of the present invention are shown to make the present invention understood more easily. These Examples, however, are given to illustrate the present invention and are not to be construed as limiting the scope of the present invention.

The process according to the invention is illustrated by the following Examples in which the percentages quoted represent percentages by weight.

EXAMPLE I

These examples show methods of producing cheese-type products.
1. Producing of cheese-type food in block form
80 kilograms of fresh milk was pasteurized at 75° C. After cooling, ultrafiltration(unit; 2.2 square meters, from Rhone-poulin) is carried out to effect reduction in volume of 4 to 1 which means that the volume of the retentate is one forth of the volume of the starting milk.

After the ultrafiltration, the retentate was cooled to 15° C. and then acidified to pH 5.6 by the addition of lactic acid.

Then, 0.6 g rennet was mixed with 100 ml water and this mixture added to the retentate and set undisturbed for 30 minutes, followed by spray drying (100° C. the blower, 60° C. at exhaust) till the water content fell to 5% or lower, to obtain 6 kilograms of powdered milk.

To one kilogram of powdered milk prepared above, 24 grams of sodium polyphosphate and 8 grams sodium diphosphate were added as emulsifying salts, together with 20 grams of table salt and some sodium glutamate as seasoning, and blended well. This powdery blend was introduced into an emulsifying kettle for producing processed cheese (Kustner), to which 600 milliliter of water is added to make 45% water content of final product.

With stirring blades of the kettle turning at 120 rotations per minute, temperature of the mixture would reach 65° C. in 5 minutes by the injection of steam.

When the temperature of the fusing mixture reaches 65° C., the kettle was removed from heat and unfused mixture on the blades is scraped off. After adding 0.5 milliliter of annatto coloring (Takasago Koryo, K. K.) and 0.5 milliliter of Gouda-Type cheese flaver (Takasago Koryo, K. K.), the mixture is melted and pasteurized until the temperature reaches 85° C. in 3 minutes. Then the mixture is packed in a container and cooled to make final product. The product had good taste and texture, equal to those of ordinary processed cheese, without any pronounced smell of casein.
2. Producing of chesse-type food with melting and stringing properties.

A retentate, prepared as in the above Example 1, was inoculated with 2% of thermophilic culture *L. bulgaricus* and *S. thermophilus*, and cultured for 6 hours at 37° C. to adjust the retentate to pH 5.2.

The retentate was t hen dried by spray-drying (100° C. at the blower, 60° C. at exhaust) until the water content fell to 5% or below to obtain 6 kilograms of powdered milk.

To one kilogram of powdered milk prepared above, 10 grams of sodium monophosphate and 6 grams of sodium polyphosphate were added as emulsifying salts, together with 4.5 grams guar gum and xanthan gum as stabilizers, and 20 grams of table salt and 1 gram of sodium glutamate as seasoning, after which the whole lot was blended well.

This mixture was then introduced into W-spiral emulsifying kettle, to which 800 milliliters of water was added to make the water content of the finished product 47%.

With the spiral rotating at low speed (60 rpm), the mixture was steamed and fused in a way that the temperature would reach 65° C. in five minutes. As the Example 1, coloring and flavoring was added when the temperature reached 65° C., followed by additional heating to melt and pasteurized the mixture for 2 minutes till the temperature reached 72° C. The mixture was then poured into a mold and chilled quickly to produce the product.

This product melted just like mozzarella cheese when warmed in the oven, producing the same degree of string. Taste was excellent with practically no smell of casein.

EXAMPLE II

This Example shows methods of producing natural cheese
1. producing of Gouda-type cheese
80 kilograms of fresh milk was pasteurized at 75° C. After cooling, ultrafiltration is carried out to effect reduction in volume of 4 to 1 which means that the volume of the retentate is one forth of the volume of the starting milk.

This retentate was cooled to 15° C., and adjusted to a pH of 5.3 by addition of lactic acid.

Then the retentate was added 10% of mixed lactic-acid bacteria starter containing thermophilic culture *L. bulgaricus* and *S. thermophilus*, together with 0.003% rennet, and set undisturbed for 30 minutes.

The milk was then dried with spray-drying (100° C. at the blower, 60 ° C. at exhaust) until the water content fell to 5% or below, to obtain 6 kilograms of powdered milk. To thus obtained powdered milk, 110 grams of table salt and 4.3 kilograms of water was added, mixed well, and poured into a mold.

The mixture in the mold was then pressed at 0.1 kilogram per square meter for one hour, at 0.15 kilogram per square meter for two hours, and at 0.2 kilogram per square meter for three hours to obtain green cheese.

This green cheese was ripened at 10° C. and 85% humidity for four months to obtain Gouda-type natural cheese.

2. Producing of Gouda-type cheese

After preparing 20 kilograms of retentate as in the Example II, inoculated with 2% of a mixed lactic acid bacteria starter, containing thermophilic culture *L. bulgaricus* and *S. thermophilus* and then fermented to pH 5.2 under the condition of 30° C. and for 6 hours.

Then, 0.003% rennet was added to this mixture and was let stand for 30 minutes, after which it was dried by spray-drying (100° C. at the blower, 60° C. at exhaust) until the water content fell to 5% or below to obtain 6 kilograms of powdered milk.

To the thus obtained powdered milk, 110 grams of table salt and 4.3 kilograms of water was added, mixed well and poured into a mold. The mixture in the mold was then pressed at 0.1 kilogram per square meter for one hour, at 0.15 kilogram per square meter for two hours, and at 0.2 kilogram per square meter for three hours to obtain green cheese.

This green cheese was ripened at 10° C. and 85% humidity for four months to obtain Gouda-type natural cheese.

What is claimed is:

1. A method of producing processed cheese consisting essentially of: forming a concentrated milk by ultrafiltration adjusting the pH of the concentrated milk to pH 5.0–5.8; spray drying the concentrated milk by contact with hot air in a spray dryer to obtain a powdered milk having a moisture content of 5 percent or less, said hot air having a temperature at the spray dryer inlet of 80° to 100° C., and at the spray dryer outlet of 60° to 80° C., forming a liquid mixture by heating said powdered milk, emulsifying salt and water; and thereafter cooling the liquid mixture and obtaining the processed cheese.

2. A method of producing natural cheese consisting essentially of: forming a concentrated milk by ultrafiltration adding an organic acid and lactic acid bacteria starter or lactic acid bacteria starter alone to the concentrated milk in an amount to provide a pH 5.0–5.8; spray drying the concentrated milk by contact with hot air in a spray dryer to obtain a powdered milk having a moisture content of 5 percent or less, said hot air having a temperature at the spray dryer inlet of 80° to 100° C., and at the spray dryer outlet of 60° to 80° C., forming a liquid mixture of powdered milk, sodium chloride and water; pressing the mixture in a mold to provide a green cheese, and thereafter allowing said green cheese to form the natural cheese.

3. The method according to claim 1 or claim 2 wherein concentration is performed by ultrafiltration to 2–6 fold concentrations.

4. The method according to claim 1 or claim 2, wherein the pH is biologically adjusted by addition of lactic-acid bacteria starter to the concentrated milk.

5. The method according to claim 1 or claim 2, wherein the pH is chemically adjusted by addition of organic acid to the concentrated milk.

6. The method according to claim 1 or claim 2, wherein the pH is adjusted at 15° C. or below.

7. The method according to claim 1 or claim 2, wherein κ-casein in the concentrated milk is converted to para κcasein by the addition of rennet.

8. A method of producing a powdered milk product useful in the preparation of cheese consisting essentially of: forming a concentrated milk by ultrafiltration; adjusting the pH of the concentrated milk to pH 5.0–5.8; spray drying the concentrated milk by contact with hot air in a spray dryer to obtain a powdered milk product having a moisture content of 5 percent or less, said hot air having a temperature at the spray dryer inlet of 80° to 100° C., and at the spray dryer outlet of 60° to 80° C. and recovering said powdered milk product.

9. A method of producing a powdered milk product useful in the preparation of natural cheese consisting essentially of: forming a concentrated milk by ultrafiltration; adding an organic acid and lactic acid bacteria starter or lactic acid bacteria starter alone to the concentrated milk in an amount to provide a pH 5.0–5.8; spray drying the concentrated milk by contact with hot air in a spray dryer to obtain a powdered milk having a moisture content of 5 percent or less, said hot air having a temperature at the spray dryer inlet of 80° to 100° C., and at the spray dryer outlet of 60° to 80° C., and recovering said powdered milk product.

* * * * *